United States Patent
Eki

(10) Patent No.: US 8,094,335 B2
(45) Date of Patent: Jan. 10, 2012

(54) IMAGE PROCESSING APPARATUS FOR CONVERTING PRINT DATA TO BITMAP DATA, AND OUTPUTTING A COLOR OR MONOCHROME IMAGE

(75) Inventor: Koji Eki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1309 days.

(21) Appl. No.: 11/786,346

(22) Filed: Apr. 10, 2007

(65) Prior Publication Data

US 2007/0242297 A1 Oct. 18, 2007

(30) Foreign Application Priority Data

Apr. 10, 2006 (JP) ................................. 2006-107664

(51) Int. Cl.
G06F 3/12 (2006.01)
G06K 1/00 (2006.01)

(52) U.S. Cl. ........................................ 358/1.15; 358/1.9

(58) Field of Classification Search .................... 358/1.1, 358/1.9, 1.13, 1.15, 462, 529, 521, 530; 382/165, 382/171, 176

See application file for complete search history.

(56) References Cited

U.S. PATENT DOCUMENTS

| | | | | |
|---|---|---|---|---|
| 6,226,397 B1 * | 5/2001 | Yamagata et al. | ............ | 382/162 |
| 6,804,028 B1 * | 10/2004 | Fukuta | ............. | 358/2.1 |
| 7,218,414 B2 * | 5/2007 | Nakao | ............. | 358/1.9 |
| 7,345,795 B2 * | 3/2008 | Ando | ............. | 358/474 |
| 7,365,865 B2 * | 4/2008 | Kidani et al. | .............. | 358/1.13 |
| 7,612,910 B2 * | 11/2009 | Oki | .............. | 358/1.9 |
| 7,646,504 B2 * | 1/2010 | Kawamoto | .............. | 358/1.15 |
| 2004/0223188 A1 * | 11/2004 | Toda | .............. | 358/2.1 |
| 2006/0244988 A1 * | 11/2006 | Oishi | ............ | 358/1.13 |

FOREIGN PATENT DOCUMENTS

| | | |
|---|---|---|
| JP | 11-320978 | 11/1999 |
| JP | 2002-044465 | 2/2002 |
| JP | 2003-244452 | 8/2003 |
| JP | 2003-320715 | 11/2003 |
| JP | 2004-070521 | 3/2004 |
| JP | 2004-255610 | 9/2004 |
| JP | 2005-216031 | 8/2005 |

* cited by examiner

*Primary Examiner* — Gabriel Garcia
(74) *Attorney, Agent, or Firm* — David G. Conlin; Steven M. Jensen; Edwards Wildman Palmer LLP

(57) ABSTRACT

An image processing apparatus is provided that can accurately and rapidly perform color/monochrome judgment for print image data. In the image forming apparatus, a command analyzing unit interprets externally received PDL data, and a first color/monochrome judging unit performs the color/monochrome judgment based on an attribute of an image object. When a data type of the attribute is not raster image data and color information is monochrome, it is immediately judged that the image is monochrome. Only when the first color/monochrome judging unit judges that the image is color, a second color/monochrome judging unit performs the color/monochrome judgment every time a rendering unit generates band data. If at least one pixel of color data exists, it is judged that the image is color. With such a configuration, the color/monochrome judgment can be performed accurately and rapidly.

13 Claims, 7 Drawing Sheets

IMAGE PROCESSING APPARATUS FOR CONVERTING PRINT DATA TO BITMAP DATA, AND OUTPUTTING A COLOR OR MONOCHROME IMAGE

CROSS-NOTING PARAGRAPH

This Non-provisional application claims priority under 35 U.S.C. §119 (a) on Patent Application No. 2006-107664 filed in JAPAN on Apr. 10, 2006, the entire contents of which are hereby incorporated herein by reference.

FIELD OF THE INVENTION

The present invention relates generally to an image processing apparatus that processes image data to be supplied to an image forming apparatus, and, more particularly, to an image processing apparatus that processes image data to be supplied to an image forming apparatus that can form a full color image and a monochrome image.

BACKGROUND OF THE INVENTION

Recently, many image forming apparatuses such as copiers, printers, and facsimiles can form color images, and such digital color printing apparatuses are rapidly becoming widespread. The digital color printing apparatuses are replacing digital monochrome printing machines currently used in offices.

Such an image forming apparatus can easily print a color document created using so-called presentation software, color image data taken with digital cameras, etc., in an office.

However, printing must be also performed for text data or form outputs written only in black and white and documents previously filed electronically as monochrome data, and such documents are also printed by the digital printing apparatus.

When the digital printing apparatus prints and outputs black and white pages, a print mode must be switched from a color mode to a black-and-white mode (monochrome mode) from a viewpoint of print cost and apparatus life. This switching is performed for each page by judging first an attribute of each page of the document (i.e., whether a color page or a black-and-white page) in an image processing apparatus that supplies image data to an image forming apparatus before printing, and by transmitting the judged attribute and the image data corresponding to the document to the color printing apparatus. Some color printing apparatuses include such a judging function of the image processing apparatus.

Conventional image processing apparatuses that switch the color mode and the monochrome mode to print include a color/monochrome distributed printing system that references at least one of either text data or image data included in print data to judge into which the print data is classified, color information or monochrome information (see Japanese Laid-Open Patent Publication No. 2004-070521).

In a conventionally proposed image processing apparatus, pixel data represented by four colors of CMYK respectively are converted into a uniform color space such as CIEXYZ and CIELAB spaces and it is judged to be a color image if the color difference after conversion is a certain value or more and to be a black-and-white image if the color difference is a certain value or less (see Japanese Laid-Open Patent Publication No. 2003-244452).

In a conventionally proposed image data creating apparatus, object data included in each band that is one of a plurality of partial images obtained by dividing an image are checked and it is judged that a band is color if the band includes color and that a band is monochrome data if the band does not include an object to be depicted in color (see Japanese Laid-Open Patent Publication No. 2002-044465).

In a conventionally proposed information processing apparatus, a print command received from a host apparatus such as a personal computer is analyzed and converted into predetermined intermediate data, all the pixels of RGB image data generated based on the converted intermediate data are judged (hereinafter, called "color/monochrome judgment") that they are color or monochrome, and CMYK image data are generated based on the result of this judgment (see Japanese Laid-Open Patent Publication No. 2003-320715).

However, although a user can set the standard of color judgment in the conventional color/monochrome distributed printing system described in Japanese Laid-Open Patent Publication No. 2004-070521, the system is not designed to accurately perform the color/monochrome judgment.

Although the consumed image memory can be minimized in the conventional image processing apparatus described in Japanese Laid-Open Patent Publication No. 2003-244452, the apparatus also is not designed to accurately perform the color/monochrome judgment.

Although the overall speed for creating image data can be improved in the conventional image data creating apparatus described in Japanese Laid-Open Patent Publication No. 2002-044465, the apparatus also is not designed to accurately perform the color/monochrome judgment.

The conventional information processing apparatus described in Japanese Laid-Open Patent Publication No. 2003-320715 can accurately perform the color/monochrome judgment by performing the color/monochrome judgment for all the pixels of the image data generated from the print intermediate data. However, since the judgment is performed for all the pixels, a processing amount is increased and the processing cannot be performed rapidly. Since this conventional information processing apparatus generates a second image data based on the result of the color/monochrome judgment, an additional memory area is needed, and since a special process must be performed by a special circuit or software for generating the final image data, the processing cannot be performed rapidly.

SUMMARY OF THE INVENTION

It is the object of the present invention to provide an image processing apparatus that can perform the color/monochrome judgment for print image data with accuracy and rapidly.

A first invention is an image processing apparatus that controls a predetermined image forming apparatus to output an image corresponding to bitmap data converted from predetermined print data, comprising:

a first judging unit that judges whether the image is color or monochrome according to attribute data obtained based on the print data indicating the attribute of the image;

a bitmap data generating unit that generates color bitmap data based on the print data if the first judging unit judges that the image is color, and generates monochrome bitmap data based on the print data if the first judging unit judges that the image is monochrome;

a second judging unit that judges whether the image is color or monochrome based on the color bitmap data generated by the bitmap data generating unit; and a print controlling unit that controls the image forming apparatus to output a color or monochrome image depending on the result of the judgment of the first and second judging units, based on the bitmap data generated by the bitmap data generating unit.

A second invention is the image processing apparatus as defined in the first invention, wherein if the second judging unit judges that the image is monochrome, the print controlling unit controls the image forming apparatus to output a monochrome image based only on monochrome bitmap data included in the color bitmap data generated by the bitmap data generating unit.

A third invention is the image processing apparatus as defined in the first invention, wherein the first judging unit judges whether the image is color or monochrome based on the attribute data including at least a data type and color information of the image.

A fourth invention is the image processing apparatus as defined in the third invention, wherein the first judging unit judges that the image is color if the data type is the bitmap data or if the color information is color, and judges that the image is monochrome if the data type is data other than the bitmap data and the color information is monochrome.

A fifth invention is the image processing apparatus as defined in the first invention, wherein the second judging unit sequentially performs the judgment of whether the image is color or monochrome one-by-one for a plurality of the band data that should compose the color bitmap data generated by the bitmap data generating unit, and omits the judgment when once the image is judged to be color.

A sixth invention is the image processing apparatus as defined in the first invention, further comprising:

an intermediate data generating unit that generates a plurality of intermediate data for generating a plurality of the band data that should compose the bitmap data by the bitmap data generating unit, based on the print data; and a blank attribute adding unit that adds an attribute indicating blank to intermediate data not including data representing the image in the plurality of the intermediate data, wherein the second judging unit omits the judgment of whether the image is color or monochrome for the band data corresponding to the intermediate data with the attribute indicating blank added.

A seventh invention is the image processing apparatus as defined in the sixth invention, wherein the bitmap data generating unit sequentially generates the bitmap data for each one of the band data and omits the generation of the band data corresponding to the intermediate data with the attribute indicating blank added.

An eighth invention is the image processing apparatus as defined in the first invention, further comprising a data compressing unit that sequentially compresses a plurality of the band data that should compose a portion of the bitmap data generated by the bitmap data generating unit, wherein the second judging unit sequentially, one-by-one for the plurality of the band data, compares a compressed data size of the band data compressed by the data compressing unit with a preliminary stored compressed data size in the case of compressing the band data not including the data indicating the image by the data compressing unit and omits the judgment of whether the image is color or monochrome for the band data that have the compressed data size of the compressed band data identical to the preliminarily stored compressed data size.

A ninth invention is a controlling method of an image processing apparatus controlling a predetermined image forming apparatus to output an image corresponding to bitmap data converted from predetermined print data, comprising:

a first judging step of judging whether the image is color or monochrome according to attribute data obtained based on the print data indicating the attribute of the image;

a bitmap data generating step of generating color bitmap data based on the print data if it is judged in the first judging step that the image is color and generating monochrome bitmap data based on the print data if it is judged in the first judging step that the image is monochrome;

a second judging step of judging whether the image is color or monochrome based on the color bitmap data generated in the bitmap data generating step; and a print controlling step in which the image forming apparatus is controlled to output a color or monochrome image depending on the result of the judgment of the first and second judging steps, based on the bitmap data generated in the bitmap data generating step.

A tenth invention is a program for an image processing apparatus that controls a predetermined image forming apparatus to output an image corresponding to bitmap data converted from predetermined print data to perform the steps comprising:

a first judging step of judging whether the image is color or monochrome according to attribute data obtained based on the print data indicating the attribute of the image;

a bitmap data generating step of generating color bitmap data based on the print data if it is judged in the first judging step that the image is color and generating monochrome bitmap data based on the print data if it is judged in the first judging step that the image is monochrome;

a second judging step of judging whether the image is color or monochrome based on the color bitmap data generated in the bitmap data generating step; and a print controlling step in which the image forming apparatus is controlled to output a color or monochrome image depending on the result of the judgment of the first and second judging steps, based on the bitmap data generated in the bitmap data generating step.

PREFERRED EMBODIMENTS OF THE INVENTION

First Embodiment

Figure 1:
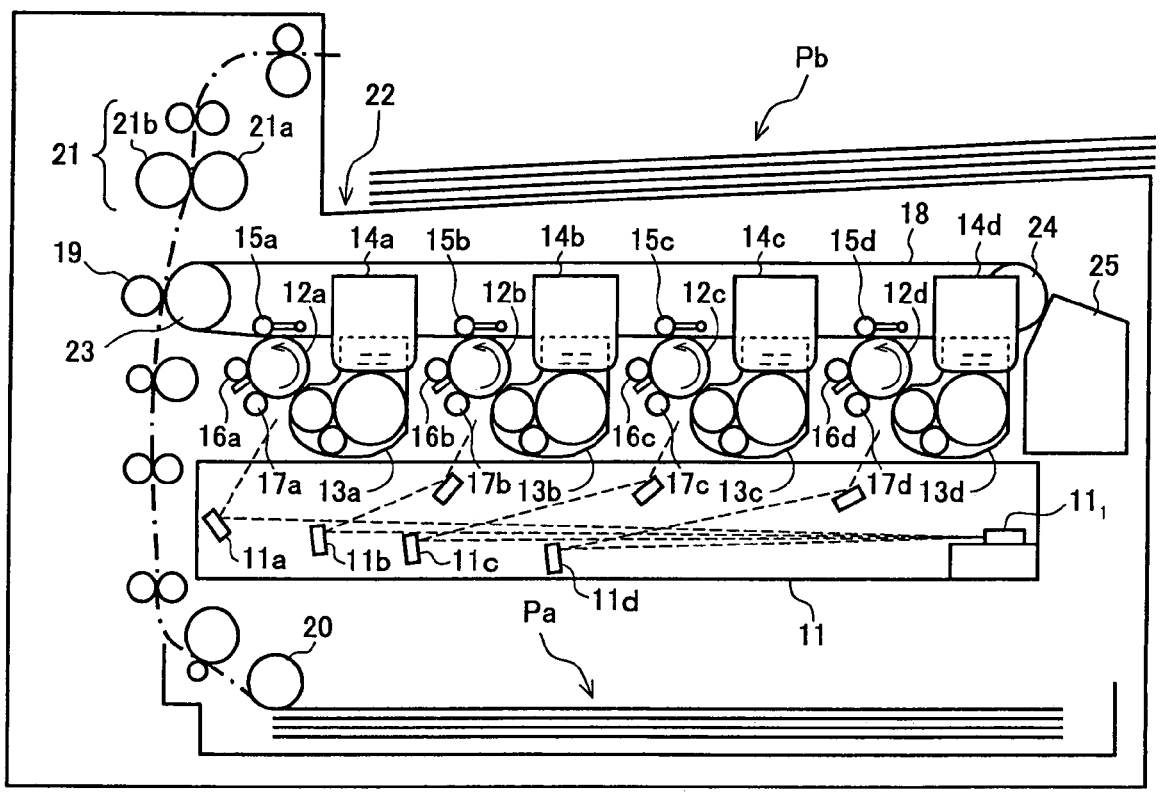
FIG. 1 is a simplified side view of a configuration of an image forming apparatus (digital composite machine) according to a first embodiment of the present invention.

FIG. 1 is a simplified side view of a configuration of an image forming apparatus (digital composite machine)

according to a first embodiment of the present invention. The image forming apparatus outputs sheets Pb which have full color or monochrome images formed on sheets Pa based on image data supplied from the outside of the apparatus. Therefore, the image forming apparatus includes an exposing unit 11, photoconductor drums 12a to 12d, developing apparatuses 13a to 13d, toner cartridges 14a to 14d, first transfer rollers 15a to 15d, cleaning units 16a to 16d, charging rollers 17a to 17d, an intermediate transfer belt 18 for forming an image, a second transfer roller 19, a fixing unit 21 consisting of a heating roller (a fixing roller) 21a and a pressure roller 21b; a sheet separating roller 20, and a sheet discharge tray 22. Although a sheet conveying path is shown with a dot-and-dash line in FIG. 1 and a sheet is guided through the conveying path by predetermined rollers, etc., including a conveying roller, a detailed description is omitted.

This image forming apparatus forms an image based on image data corresponding to each hue of four colors, which are black (K) and the subtractive three primary colors of cyan (C), magenta (M), and yellow (Y). For example, the image forming apparatus includes the photoconductor drum 12a, the developing apparatus 13a, the toner cartridge 14a, the first transfer roller 15a, the cleaning unit 16a, the charging roller 17a, and the similar configuration (such as the photoconductor drums 12b to 12d, developing apparatuses 13b to 13d, toner cartridges 14b to 14d, first transfer rollers 15b to 15d, cleaning units 16b to 16d, and charging rollers 17b to 17d) to form other three color images. These elements are disposed in a line as shown in FIG. 1 along the direction the intermediate transfer belt 18 moves.

The charging rollers 17a to 17d are contact chargers that uniformly charge the surfaces of the photoconductor drums 12a to 12d, which are image carriers, to be a predetermined voltage. Although the charging rollers 17a to 17d are used for charging apparatuses in this embodiment, the charging apparatuses used are not limited to the charging rollers and, for example, apparatuses using fur brushes, magnetic brushes, or corona wires, apparatuses in the saw-tooth shape, or ion generating apparatuses can be used as long as a desired charged voltage is applied to the photoconductor.

The exposing unit 11 is a laser beam scanning apparatus, includes a semiconductor laser (not shown), a polygon mirror $11_1$, one or more reflecting mirrors 11a to 11d, etc., and applies four laser beams modulated based on image data corresponding to each hue of black, cyan, magenta, and yellow to the surfaces of the corresponding photoconductor drums 12a to 12d. Therefore, an electrostatic latent image is formed on the surface of the corresponding photoconductor drums 12a to 12d based on the image data corresponding to each hue of black, cyan, magenta, and yellow. Instead of the semiconductor laser, for example, a well-known write head may be used which is formed by arranging EL or LED in an array.

The toner cartridges 14a to 14d are detachably attached near the upper portion of the developing apparatuses 13a to 13d and store toners that are developers corresponding to the hues of black, cyan, magenta, and yellow.

The developing apparatuses 13a to 13d supply toner to the surfaces of the photoconductor drums 12a to 12d on which electrostatic latent images formed and develop the electrostatic latent images into toner images, which are developer images. Specifically, the developing apparatuses 13a to 13d receive the toner corresponding to the hues from supply ports (not shown) of the toner cartridges 14a to 14d attached to the upper portion of each apparatus and use the toner to develop the electrostatic latent images corresponding to the hues formed on the photoconductor drums 12a to 12d into the toner images corresponding to the hues of black, cyan, magenta, and yellow. The cleaning units 16a to 16d remove and collect the toner remaining on the surfaces of the photoconductor drums 12a to 12d after the image is developed and transferred.

The intermediate transfer belt 18 is formed endlessly with a film about 100 μm to 150 μm thick and is stretched between a driving roller 23 and a driven roller 24 to form a loop-shape movement path shown in FIG. 1. The outer circumferential surface of the intermediate transfer belt 18 faces to the photoconductor drum 12d, the photoconductor drum 12c, the photoconductor drum 12b, and the photoconductor drum 12a, and the intermediate transfer belt 18 rotates to face the photoconductor drums 12a to 12d in the above order. The first transfer rollers 15a to 15d are disposed at positions facing the photoconductor drums 12a to 12d through the intermediate transfer belt 18. The first transfer rollers 15a to 15d are rollers formed by covering a surface of a metal (e.g., stainless steel) shaft having a diameter of 8 mm to 10 mm with a conductive elastic material (e.g., EPDM or urethane foam). Because of the conductive elastic material, a high voltage can uniformly be applied to the intermediate transfer belt 18. Although a roller shape is used herein, a brush, etc., may also be used.

When a full color image is formed, a first transfer bias, i.e., a constant voltage with the reverse polarity (+) of the charge polarity (−) of the toner is applied to the first transfer rollers 15a to 15d to transfer the toner images carried by the surfaces of the photoconductor drums 12a to 12d onto the intermediate transfer belt 18. The first transfer rollers are pressure welded onto against the inner circumferential surface of the intermediate transfer belt 18 with a predetermined nip pressure. Therefore, the toner images corresponding to the hues formed on the photoconductor drums 12a to 12d are transferred one upon another on the outer circumferential surface of the intermediate transfer belt 18, and a full color toner image is formed on the outer circumferential surface of the intermediate transfer belt 18. When a monochrome image is formed, only the first transfer roller 15a disposed at the position facing the photoconductor drum 12a for black is charged, and the transfer rollers 15b to 15d disposed at the positions facing other photoconductor drums 12b to 12d are not charged and moved away from the intermediate transfer belt 18 by a predetermined distance with a predetermined contact/separation mechanism. Therefore, only the black toner image is formed on the outer circumferential surface of the intermediate transfer belt 18.

The toner image transferred onto the outer circumferential surface of the intermediate transfer belt 18 is conveyed by the rotation of the intermediate transfer belt 18 to a position facing the second transfer roller 19. When an image is formed, the second transfer roller 19 is pressure welded with a predetermined nip pressure on the outer circumferential surface of the intermediate transfer belt 18 of which inner circumferential surface is in contact with the circumferential surface of the driving roller. If the roller is pressure welded, one of the pair of rollers is made of a hard material such as metal and the other is made of an elastic material such as an elastic rubber roller or a resin foam roller.

A sheet is supplied by the sheet separating roller 20 that pulls out the sheet Pa one-by-one from a sheet supply cassette storing the sheets Pa, and when the sheet passes between the second transfer roller 19 and the intermediate transfer belt 18, a high voltage with the reverse polarity to the charge polarity of the toner is applied to the sheet. As a result, a full color or monochrome toner image is transferred from the outer circumferential surface of the intermediate transfer belt 18 to the surface of the sheet. Among the toners attached to the intermediate transfer belt 18, the toner not transferred to the sheet and remaining on the intermediate transfer belt 18 is collected by the cleaning unit 25 including a cleaning blade disposed in sliding contact with the driven roller 24 to prevent color mixture.

After the sheet, on which the toner image that is a full color or monochrome image is transferred, is guided to the fixing unit 21 and heated and pressurized when passing between the heating roller 21a and the pressurizing roller 21b configuring the fixing unit 21. The heating roller 21a is set to be a predetermined fixing temperature by a controlling unit based on a signal from a temperature detector (not shown). According to the operation of the fixing unit 21, the toner image is steadily fixed on the surface of the sheet. The sheet Pb with the toner image fixed is discharged by the discharging roller onto the sheet discharge tray 22 (with the printed surface facing downward).

The image forming operation as described above is performed by multiple driving units including an electric motor and gears (not shown) and the controlling unit that controls these driving units, and the function of the controlling unit is realized by a microcomputer receiving information of sensors, an operation input unit, etc., (not shown). A functional configuration of the image forming apparatus including the function of the controlling unit will hereinafter be described.

Figure 2:
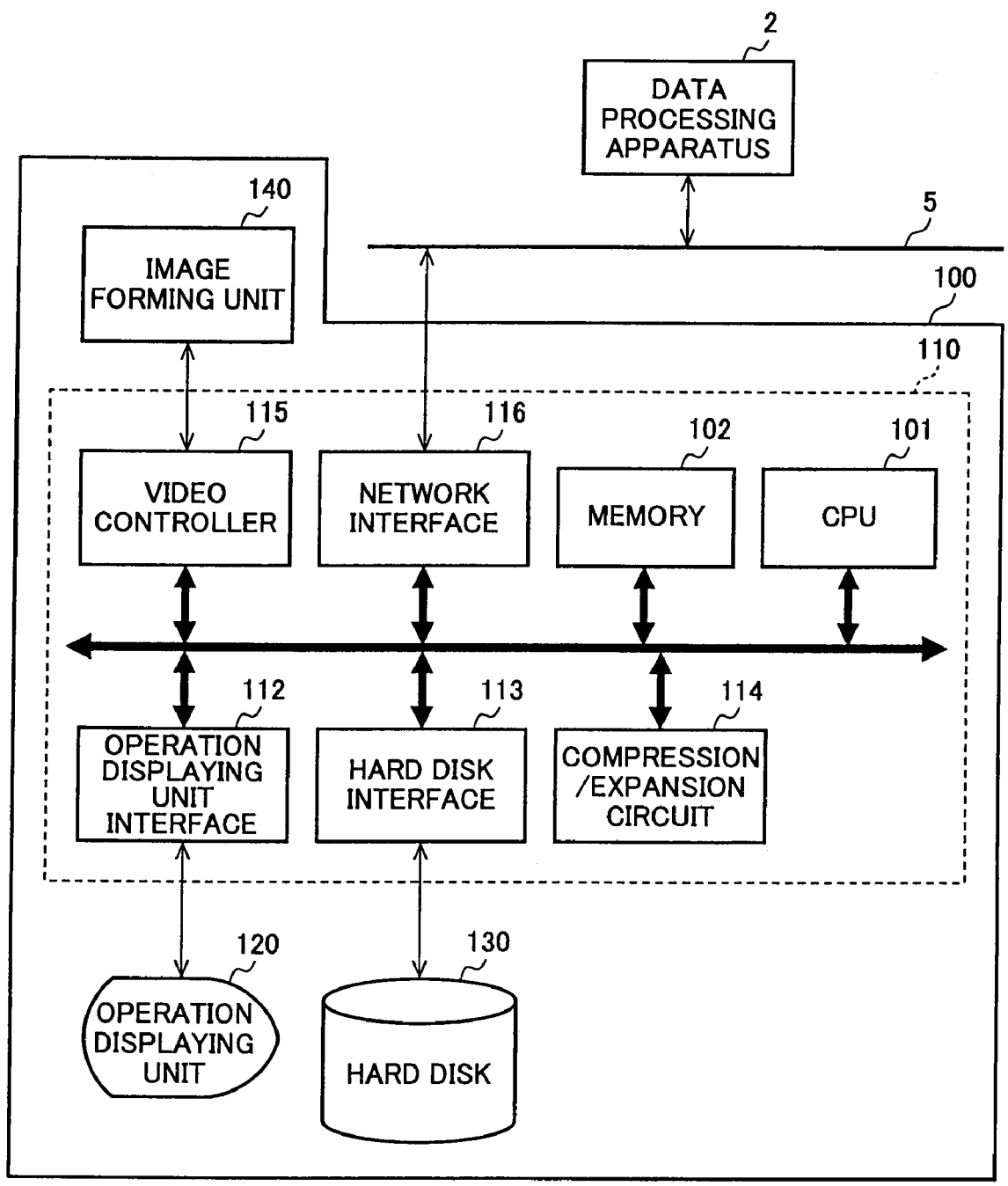
FIG. 2 is a block diagram of a functional configuration of the image forming apparatus according to the embodiment.

FIG. 2 is a block diagram of the functional configuration of the image forming apparatus according to the first embodiment of the present invention. The image forming apparatus 100 shown in FIG. 2 receives print data supplied through a predetermined communication line 5 from an external computer terminal such as a data processing apparatus 2 and outputs the image corresponding to the received print data on a predetermined sheet.

Specifically, the print data is a file including data written in a page description language (PDL) that can be interpreted by the image forming apparatus 100. The image forming apparatus 100 and the data processing apparatus 2 are connected to communicate with each other through LAN (Local Area Network) 5 including predetermined cables and hubs. The LAN 5 may be replaced with a well-known intercommunication network such as WAN (Wide Area Network) and the internet or a communication connecting means such as USB (Universal Serial Bus) connection and various parallel interfaces.

The image forming apparatus 100 includes a printer controller (substrate) 110 composed by a CPU (Central Processing Unit) 101, a memory (semiconductor memory) 102, and various interfaces; an operation displaying unit 120 that includes a displaying apparatus comprising a liquid crystal display and an input apparatus comprising a touch panel and buttons, a hard disk storage apparatus (hereinafter, called "hard disk" or "HDD") 130 including a disk-shape magnetic storage medium, and an image forming unit 140 for forming an image on a sheet and discharging the sheet to the outside of the apparatus.

The image forming unit 140 receives bitmap data for print through a video controller 115 and forms a corresponding image on a predetermined sheet. The detailed configuration of the image forming mechanism in the image forming unit 140 is as described with reference to FIG. 1.

As shown in FIG. 2, the print controller 110 includes the CPU 101, the memory 102, an operation displaying unit interface 112 that is a connection interface to the operation displaying unit 120, a hard disk interface 113 that is a connection interface to the hard disk 130, a compression/expansion circuit 114 that compresses or expands band data described later, a video controller 115 that is a connection interface to the image forming unit 140, and a network interface 116 to communicate with the data processing apparatus 2 through the LAN 5.

The CPU 101 is connected with the memory 102 consisting of a RAM (random access memory) that is a freely writable/readable memory and a ROM (read only memory) that is a read only memory and the various interfaces described above through predetermined buses (such as memory bus, system bus, or peripheral bus). Since the connections with the buses are well-known configurations in typical computers, the detailed description thereof is omitted.

The printer controller 110 includes well-known various functions, such as a so-called copy function of forming and outputting onto a predetermined sheet an image read by a scanner unit (not shown) that optically reads an image of a target document and a so-called printer function of forming and outputting onto a predetermined sheet the print data (image data) received from the external data processing apparatus 2.

These functions are typically realized by the CPU 101 executing a predetermined program built into the ROM or deployed on the RAM of the memory 102. The program is provided from CD-ROM that is a recording medium recording the program, for example. That is, the CD-ROM is mounted as the recording medium of the program on a CD-ROM driving apparatus (not shown) built into the image forming apparatus 100 as an auxiliary storage apparatus, and the program is read from the CD-ROM and installed into the hard disk 130. The program may be provided from any recording medium other than CD-ROM or through the communication line. If a predetermined operation is performed for starting the image forming apparatus 100, the predetermined program installed in the hard disk 130 is transferred to and deployed on the RAM and is executed by the CPU 101. As a result, the various functions described above are realized.

Focusing on the printer function, various processing functions in performing the printing of an image corresponding to PDL data, which include an image processing with a characteristic configuration that judges whether PDL data supplied via the LAN 5 from the data processing apparatus 2, etc., are color data or monochrome data, are described in detail with reference to FIG. 3.

Figure 3:
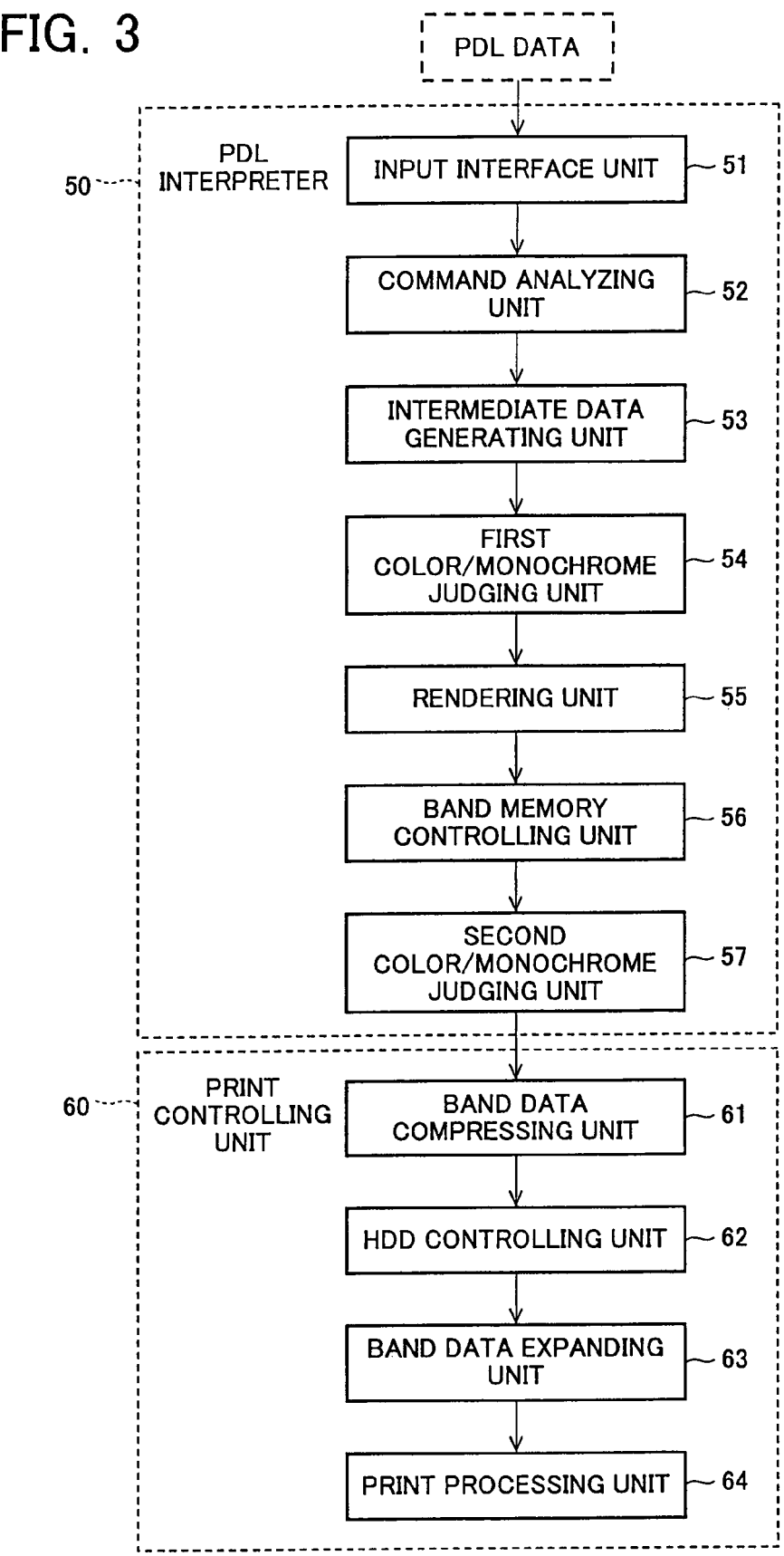
FIG. 3 is a block diagram of a functional configuration of various image processing showing the sequential flow that PDL data is printed in the image forming apparatus according to the embodiment.

FIG. 3 is a block diagram of a functional configuration of various image processing showing the sequential flow that PDL data is printed in the image forming apparatus. As shown in FIG. 3, the various processing executed to print PDL data are performed by a PDL interpreter 50 that generates a plurality of band data which are partial image data obtained by dividing image data, according to the reception and interpretation of the PDL data and a print controlling unit 60 that receives and prints the band data generated by the PDL interpreter 50.

The PDL interpreter 50 includes an input interface unit 51, a command analyzing unit 52, an intermediate data generating unit 53, a first color/monochrome judging unit 54, a rendering unit 55, a band memory controlling unit 56, and a second color/monochrome judging unit 57. Although these units are realized by a predetermined program as described above, some or all of units may be realized by predetermined hardware.

The input interface unit 51 includes the hard disk 130 and the hard disk interface 113 and temporarily stores the PDL data transmitted from the data processing apparatus 2. The PDL data stored in the input interface unit 51 are delivered to the command analyzing unit 52. The command analyzing unit 52 sequentially extracts and analyzes PDL commands included in the PDL data.

The intermediate data generating unit 53 receives the analyzed PDL commands and generates well-known intermediate data for print, which are classified into each piece of band data that should be generated based on the PDL commands. The intermediate data include description of data for configuring an object representing a target to be drawn and the attribute thereof (i.e., a type, coordinates, and color information of the object). The data for configuring an object are hereinafter referred to as object data or simply as an object.

The first color/monochrome judging unit 54 judges whether the object is color or monochrome based on the attribute of each object. As described later in detail, this judgment is not performed if a type of object data (data type) is the raster image data (bitmap image data) and the image is always handled as a color image. Although of course the image may not be color when the type of the object data is the raster image data, since a large amount of a data processing is needed for the judgment, the image is handled as a color image here and is accurately judged later by the second color/monochrome judging unit 57.

The rendering unit 55 generates the raster image data based on the corresponding intermediate data for every one of the band data. If the object data included in the intermediate data are only monochrome data, only the K image data are generated. This operational state is hereinafter referred to as a monochrome mode or K mode. If the intermediate data include color data (or handled as color data), the CMYK image data are generated. This operational state is hereinafter referred to as a color mode or CMYK mode.

If there is no intermediate data corresponding to the band data that should be generated, the attribute of the intermediate data corresponding to the band data is set as blank by the band memory controlling unit 56 since the image data are not generated. In this case, the band memory controlling unit 56 functions as a blank attribute applying means. In a second embodiment described later, if the attribute of the intermediate data is blank, the next judgment of the second color/monochrome judging unit 57 is not performed.

In the case of the color mode, the second color/monochrome judging unit 57 performs the color/monochrome judgment every time the rendering unit 55 completes the generation of one of the band data. That is, if at least one pixel exists in any CMY planes included in each of the band data in this judgment, the second color/monochrome judging unit 57 sets the subsequent processing for the corresponding page to be the color mode and does not perform the color/monochrome judgment for other band data included in the corresponding page. If no pixel data exist in the CMY planes included in all the band data in the page, the second color/monochrome judging unit 57 deletes the CMY data by setting the processing of the corresponding page to be the monochrome mode and retains only the K data.

One image to be printed consists of one or more band images, and one-page image data corresponding to this one image consist of one or more of the band data as described before. The band data includes the CMYK planes and pixel data are disposed in each plane.

The print controlling unit 60 includes a band data compressing unit 61, an HDD controlling unit 62, a band data expanding unit 63, and a print processing unit 64. The band data compressing unit 61 compresses the image data of each band data generated by the PDL interpreter 50 and supplies the compressed data to the HDD controlling unit 62 along with the page attribute information. The HDD controlling unit 62 stores the compressed band data in the HDD 130 on a page-to-page basis.

When one page of data is stored, the print processing unit 64 reads the attribute of the page to be printed from the HDD 130 and sets various information for the video controller 115 included in the print processing unit 64. If the operation mode set to the video controller 115 is the color mode, the image forming unit 140 is set to operate in the color mode by transmitting a command for image forming unit 140 to operate in the color mode. The print processing unit 64 reads the compression data of the CMYK colors for each band data from the HDD 130. The band data expanding unit 63 expands the image data read by the compression/expansion circuit 114 and transfers the data to the video controller 115. When a transfer request of the image data is transmitted from the image forming unit 140, the video controller 115 transmits the image data of the CMYK colors to the image forming unit 140 in accordance with a predetermined synchronizing signal.

If the operation mode set to the video controller 115 is the monochrome mode and the page to be printed is monochrome, the image forming unit 140 is set to operate in the monochrome mode by transmitting a command for the image forming unit 140 to operate in the monochrome mode. The print processing unit 64 reads the compression data of the K color for each band data from the HDD 130. The band data expanding unit 63 expands the image data read by the compression/expansion circuit 114 and transfers the expanded data to the video controller 115. When a transfer request of the image data is transmitted from the image forming unit 140, the video controller 115 transmits the image data of the K color to the image forming unit 140 in accordance with a predetermined synchronizing signal.

Focusing particularly on the color/monochrome judgment operation of the above operation, the operation of the image forming apparatus including this judgment operation will be described in more detail with reference to FIGS. 4 and 5. When focusing on this judgment operation, it can be said that the image forming apparatus functions as an image processing apparatus.

Figure 4:
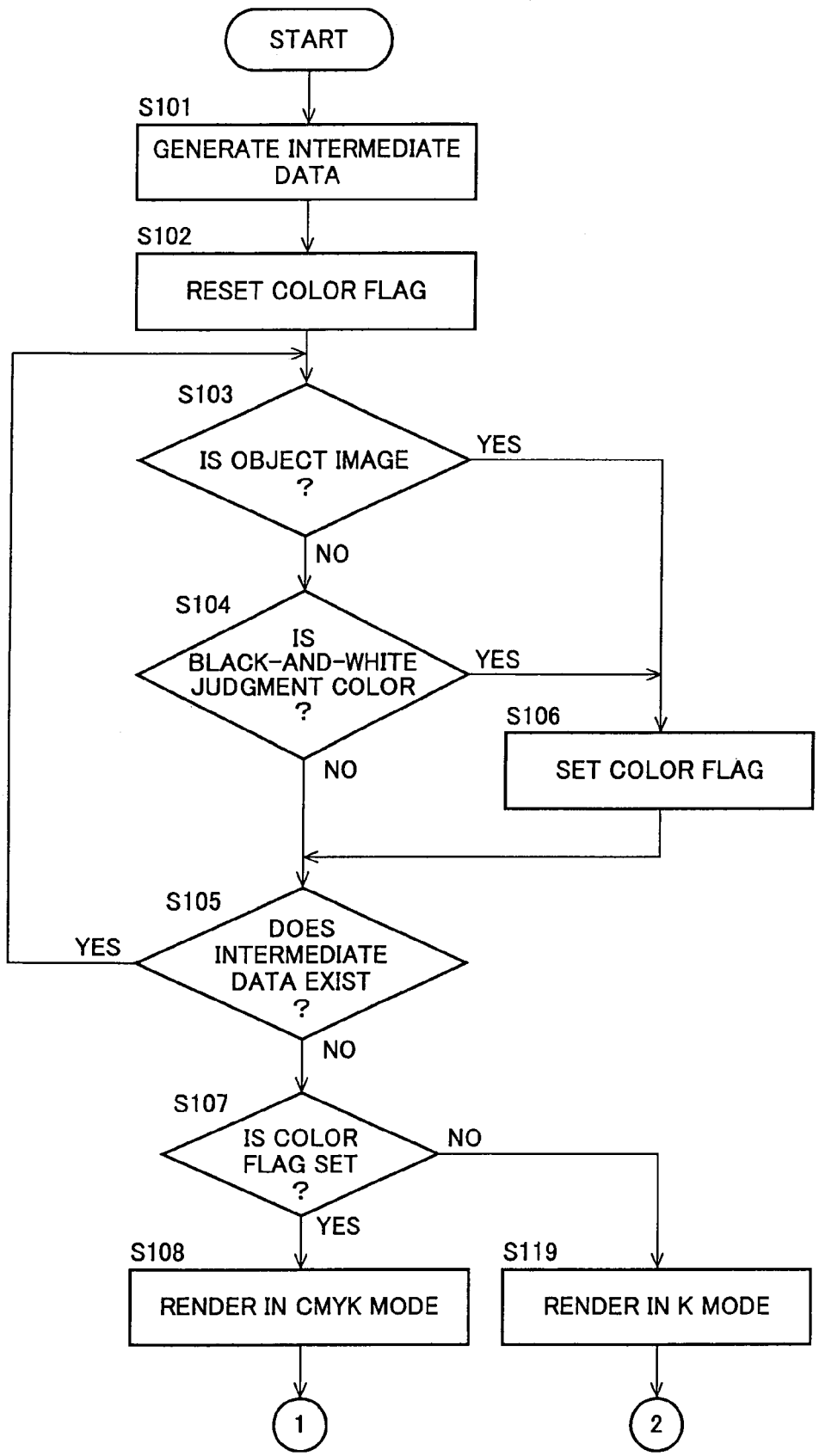
FIG. 4 is a flowchart that illustrates a flow of a first half of a processing that includes a processing of color/monochrome judgment operation performed by the image forming apparatus according to the embodiment.
Figure 5:
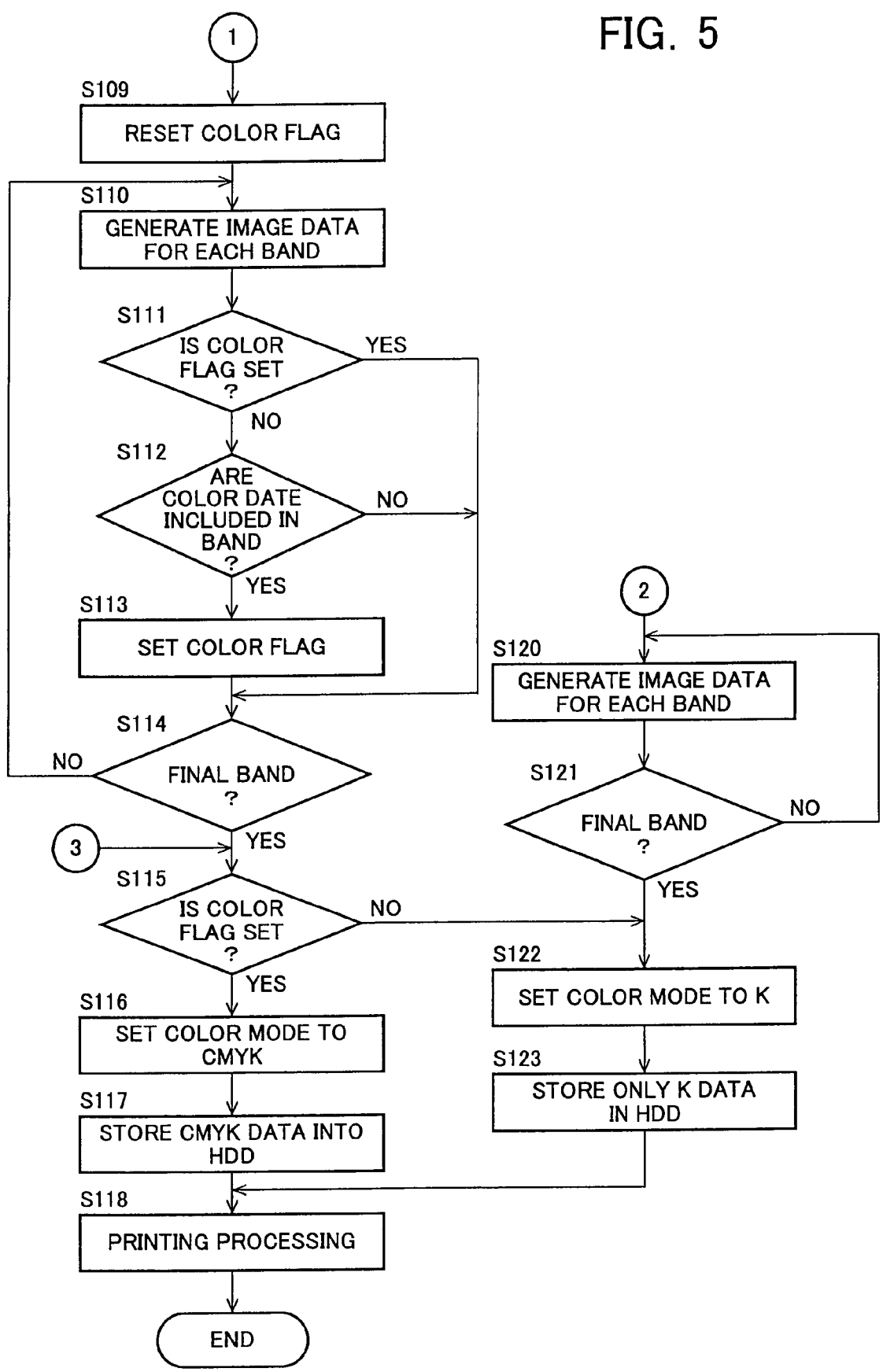
FIG. 5 is a flowchart that illustrates a flow of a second half of the processing that includes the processing of the color/monochrome judgment operation performed by the image forming apparatus according to the embodiment.

FIG. 4 is a flowchart that illustrates a flow of a first half of a processing including the processing of the color/monochrome judgment operation performed by the image forming apparatus and FIG. 5 is a flowchart that illustrates a flow of a second half of the processing including the processing of the color/monochrome judgment operation performed by the image forming apparatus.

As shown in FIG. 4, when the PDL data are sent from the data processing apparatus 2 to the image forming apparatus, the PDL interpreter 50 analyzes commands included in the PDL data to generate the corresponding intermediate data (step S101). The PDL interpreter 50 resets a color flag that is a flag representing a result of the color/monochrome judgment (step S102).

The PDL interpreter 50 then judges an attribute (data type) of an object included in the generated intermediate data (step S103). If the object data are not the raster image data (the data are characters or vector data) as a result of the attribute judgment (No at step S103), the PDL interpreter 50 performs the color/monochrome judgment based on the color information included in the attribute corresponding to the object (step S104). If the object is monochrome as a result of the color/monochrome judgment (No at step S104), the processing goes to next step S105. If the object data are the raster image data as a result of the attribute judgment (Yes at step S103) or if the object is color as a result of the color/monochrome judgment (based on the color information) (Yes at step S104), the PDL interpreter 50 sets the color flag (step S106) and the processing goes to next step S105. If it is judged that the object data are not the raster image data and are monochrome based on the object attribute (data type and color information in this case), it can be judged with accuracy and rapidly that the intermediate data are monochrome since a color image is never formed. Such color/monochrome judgment is hereinafter referred to as a first color/monochrome judgment.

The PDL interpreter 50 then judges whether the generated intermediate data exist or not (step S105) and the processing goes to next step S107 if no intermediate data exist as a result of the judgment (No at step S105). If the intermediate data further exist as a result of the judgment (Yes at step S105), the processing goes back to step S103 to repeat the processing until the generated intermediate data no longer exist (S105→S103→ . . . →S105).

And then since the first color/monochrome judgment is completed for all the intermediate data, the PDL interpreter 50 judges whether or not the color flag is set in the processing at step S106 (step S107). If the color flag is set as a result of the judgment (Yes at step S107), the rendering mode is set to CMYK to subsequently perform the rendering in the CMYK mode (step S108), and the processing goes to step S109 shown in FIG. 5. If the color flag is not set as a result of the judgment (No at step S107), the rendering mode is set to K to subsequently perform the rendering in the K mode (step S119), and the processing goes to step S120 shown in FIG. 5.

As shown in FIG. 5, if it is judged that the rendering should be performed in the K mode at step S119, the PDL interpreter 50 generates the K image data for each band data (step S120) and judges whether or not the generated image data correspond to the final band data (step S121). If the data correspond to the final band data as a result of the judgment (Yes at step S121), the processing goes to next step S122, and if the data do not correspond to the final band data as a result of the judgment (No at step S121), the processing goes back to step S120 to generate the next image data, and the processing is repeated until the image data to be judged corresponds to the final band data (S121→S120→S121). The processing of step S120 is described later.

If it is judged that the rendering should be performed in the CMYK mode at step S108 shown in FIG. 4, the PDL interpreter 50 resets the color flag to perform a second color/monochrome judgment described later (step S109). The PDL interpreter 50 then generates CMYK image data for each band data (step S110).

The PDL interpreter 50 judges whether or not the color flag is already set (step S111), and if the color flag is not set as a result of the judgment (No at step S111), it is further judged whether or not color data exist in the band data (for all the data forming the band data) (step S112). If color data exist as a result of this judgment (Yes at step S112), the color flag is set (step S113) and the processing goes to next step S114. If the color flag is already set (Yes at step S111) or if no color data exist even when the color flag is not set (No at step S112), the processing goes to next step S114 without setting the color flag. Such color/monochrome judgment is hereinafter referred to as a second color/monochrome judgment.

If the color flag is already set as described above in the second color/monochrome judgment (Yes at step S111), it is not judged whether or not color data exist in the band data (for all the data forming the band data). Therefore, if color data exist in a portion of the band data forming one page, the processing of judging whether or not color data exist in other band data is omitted (for many data) and therefore, the processing can be accelerated.

The PDL interpreter 50 judges whether or not the generated image data correspond to the final band data (step S114), if the data correspond to the final band data as a result of the judgment (Yes at step S114), the processing goes to next step S115, and if the data do not correspond to the final band data as a result of the judgment (No at step S114), the processing goes back to step S110 to generate the next image data, and the processing is repeated until the image data to be judged corresponds to the final band data (S114→S110→S111→ . . . →S114).

When the processing of all the band data is completed, the PDL interpreter 50 judges again whether or not the color flag is set (step S115), and if the color flag is set as a result of the judgment (Yes at step S115), the color mode is set to CMYK (step S116) and the print controlling unit 60 compresses and stores the CMYK data in the HDD 130 (step S117).

If the color flag is set as a result of the judgment (Yes at step S115) or if the K image data are generated for the final band data (Yes at step S121), the color mode is set to K (step S122) and the print controlling unit 60 compresses and stores only the K data in the HDD 130 (step S123). Therefore, the data size of the stored bitmap data can be reduced. Although the print controlling unit 60 to compress and store the data is explained collectively at the end for convenience of explanation, the compression and storage are actually performed every time the band data are generated.

After all the band data are created and stored in the HDD 130, the print controlling unit 60 reads them out and performs the printing processing after the printing is enabled (step S118). The processing is then terminated and when PDL data are sent again from the data processing apparatus 2 to the image forming apparatus, the above processing is started again (S101→ . . . →S118)

As described above, in this embodiment, the color/monochrome judgment can be performed accurately and rapidly by the first color/monochrome judgment processing (steps S103, S104) performed after the intermediate data generating processing (step S101) by the second color/monochrome judgment processing (steps S111, S112) performed after the image data generating processing (step S110) which is performed for each band data.

Second Embodiment

Figure 6:
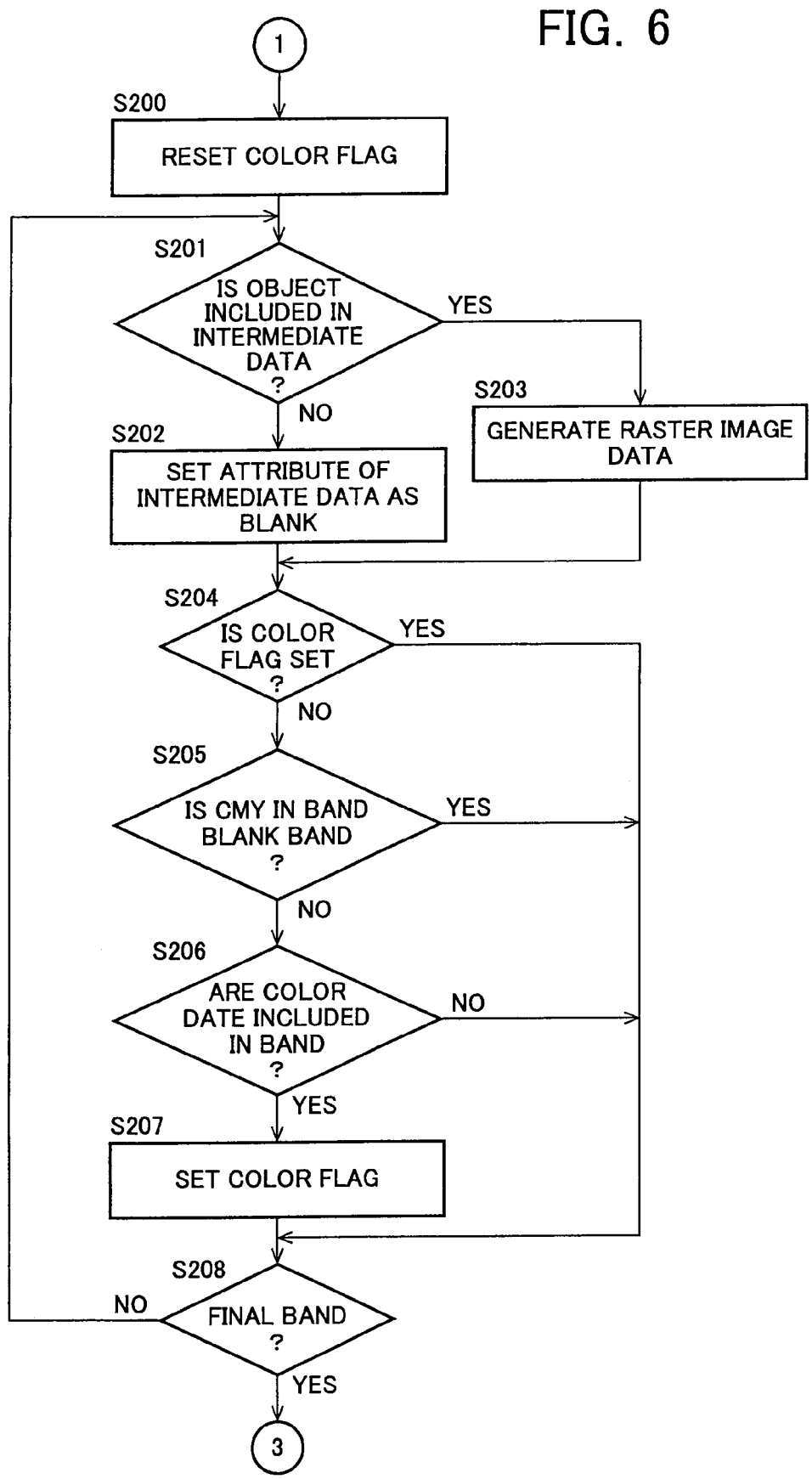
FIG. 6 is a flowchart that illustrates a flow of partial processing that includes the color/monochrome judgment processing according to a second embodiment of the present invention.

Since the configuration and operation of the image forming apparatus in this embodiment are almost the same as those of the first embodiment, the same reference numerals are added to the same constituent elements and the description thereof is omitted. In the operation of the PDL interpreter 50 of this embodiment, the processing shown in FIG. 6 is performed instead of the processing of steps S109 to S114 shown in FIG. 5 of the first embodiment. That is, although the judgments in the second color/monochrome judgment (steps S111, S112) of the first embodiment are executed for all the pixel data of the image data generated by the rendering unit 55, the judgments in the second color/monochrome judgment (steps S204 to S206) of this embodiment, the band data, which should be generated by the rendering unit 55, but corresponds to intermediate data in which no object exists (raster image data) are not generated, only the blank attribute data are set to the intermediate data, and the intermediate data with this attribute are excluded from the color/monochrome judgment. The above operation of the PDL interpreter 50 of this embodiment is described in detail with reference to FIG. 6.

FIG. 6 is a flowchart that illustrates a partial processing flow including the color/monochrome judgment processing in the second embodiment. Since this embodiment is different from the first embodiment only in the processing of steps S109 to S114 shown in FIG. 5 and other processing are the same as that of the first embodiment as described above, the same step numbers are added and the description thereof is omitted. Therefore, the first color/monochrome judgment processing (steps S103, S104) is the same as that in the first embodiment.

As shown in FIG. 6, if it is judged that the rendering should be performed in the CMYK mode at step S108 shown in FIG. 4, the PDL interpreter 50 of the embodiment resets the color flag (step S200) and judges whether or not an object exists in the intermediate data corresponding to the band data that should be generated (step S201). If the object to be rendered does not exist as a result of the judgment (No at step S201), the PDL interpreter 50 sets the attribute of the intermediate data as blank (step S202), and the processing goes to step S204 without generating the corresponding raster image data (only the blank attribute is generated). If the object exists as a result of the judgment (Yes at step S201), the corresponding raster image is generated (step S203), and the processing goes to step S204.

The PDL interpreter 50 judges whether or not the color flag is already set (step S204), and if the color flag is not set as a result of the judgment (No at step S204), it is further judged whether or not the attribute of the corresponding intermediate data is blank (step S205). If the attribute is not blank (No at step S205), it is further judged whether or not color data exist in the intermediate data (for all the data) (step S206), and if color data exist as a result of the judgment (Yes at step S206), the color flag is set (step S207) and the processing goes to next step S208. If the color flag is already set (Yes at step S204) or if the attribute of the corresponding intermediate data is blank even when the color flag is not set (Yes at step S205) or if no color data exist even when the attribute of the intermediate data is not blank (No at step S206), the processing goes to step S208 without setting the color flag.

Although the processing in the PDL interpreter 50 is the same as that in the first embodiment in the respect that the PDL interpreter 50 does not judge whether or not color data exist in the intermediate data if the color flag is already set as described above (Yes at step S204), the PDL interpreter 50 according to this embodiment does not also judge whether or not color data exist in the intermediate data if the attribute of the intermediate data is blank (Yes at step S205). Therefore, not only when color data exist in a portion of the band data composing one page, but also when the attribute of the intermediate data is blank, the processing of judging whether or not color data exist in the intermediate data is omitted (for a large amount of data) and therefore, the entire color/monochrome judgment processing can further be accelerated.

The PDL interpreter 50 judges whether or not the generated image data correspond to the final band data (step S208), if the data correspond to the final band data as a result of the judgment (Yes at step S208), the processing goes to next step S115 shown in FIG. 5, and if the data do not correspond to the final band data as a result of the judgment (No at step S208), the processing goes back to step S201 to generate the next image data, and the processing is repeated until the image data to be judged corresponds to the final band data (S208→S201→ . . . →S208). The subsequent processing is the same as that in the first embodiment.

In this embodiment, the color/monochrome judgment can be performed accurately and rapidly in the same manner as that in the first embodiment and, since the processing of judging whether or not color data exist in the intermediate data is omitted (for a large amount of data) if the attribute of the intermediate data is blank, the color/monochrome judgment processing can further be accelerated. Since the raster image data corresponding to the intermediate data with the blank attribute are not generated, the processing can also be accelerated in this regard.

Third Embodiment

Figure 7:
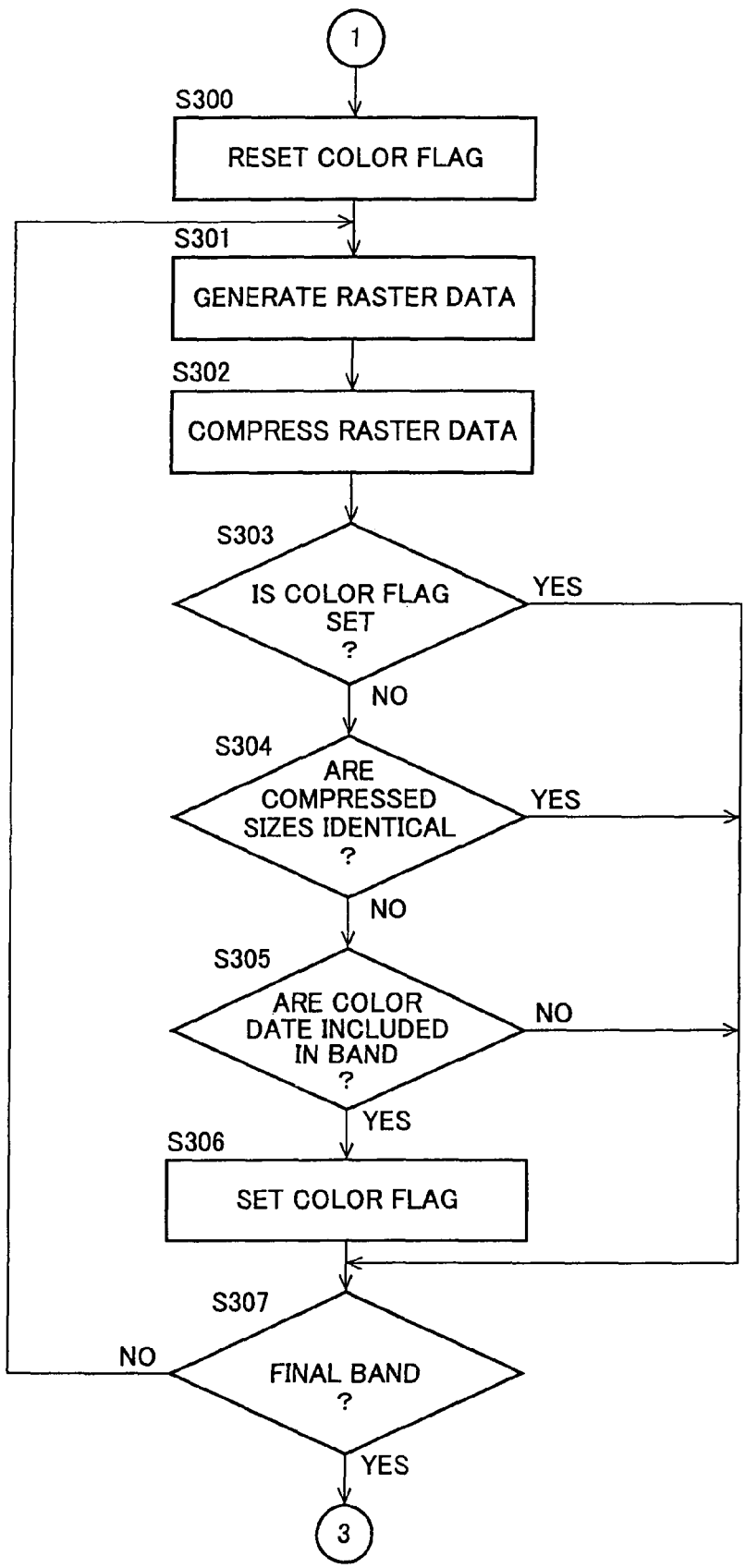
FIG. 7 is a flowchart that illustrates a flow of partial processing that includes the color/monochrome judgment processing according to a third embodiment of the present invention.

Since the configuration and operation of the image forming apparatus in this embodiment are almost the same as those of the first embodiment, the same reference numerals are added to the same constituent elements and the description thereof is omitted. In the operation of the PDL interpreter 50 of this embodiment, the processing shown in FIG. 7 is performed instead of the processing of steps S109 to S114 shown in FIG. 5 of the first embodiment. That is, although the judgments in the second color/monochrome judgment (steps S111, S112) of the first embodiment are executed for all the pixel data of the image data generated by the rendering unit 55, the judgments in the second color/monochrome judgment (step S304) of this embodiment, a value indicating a compressed data size in the case of compressing blank band data is preliminarily calculated for each sheet size to compare the calculated value with a value indicating a compressed data size of each band data generated from the intermediated data. As a result of this comparison, if the compressed data size of all the band data is the same as those of the compressed data size of the blank band data, it can be known that no color data exist in one page of data and, therefore, it can be judged that the page is a black-and-white page. The above operation of the PDL interpreter 50 of this embodiment is described in detail with reference to FIG. 7.

FIG. 7 is a flowchart that illustrates a partial processing flow including the color/monochrome judgment processing in the third embodiment. Since this embodiment is different from the first embodiment only in the processing of steps S109 to S114 shown in FIG. 5 and other processing are the same as those of the first embodiment as described above, the same step numbers are added and the description thereof is omitted. Therefore, the first color/monochrome judgment processing (steps S103, S104) is the same as that of the first embodiment.

As shown in FIG. 7, if it is judged that the rendering should be performed in the CMYK mode at step S108 shown in FIG. 4, the PDL interpreter 50 of the embodiment resets the color flag (step S300), creates raster image data corresponding to each band data (step S301), compresses the generated image data (step S302), and goes to the processing of step S303.

The PDL interpreter 50 judges whether or not the color flag is already set (step S303), and if the color flag is not set as a result of the judgment (No at step S303), it is further judged whether the compressed data size of the corresponding image data is identical to the compressed data size for the blank (step S304). If the compressed data sizes are not identical as a result of the judgment (No at step S304), it is further judged whether or not color data exist in the band data (for all the data composing the band data) (step S305), and if color data exist as a result of the judgment (Yes at step S305), the color flag is set (step S306) and the processing goes to next step S307. If the color flag is already set (Yes at step S303) or if the compressed data size of the corresponding band data is identical to the compressed data size for the blank even when the color flag is not set (Yes at step S304) or if no color data exist even when the compressed data sizes are not identical (No at step S305), the processing goes to step S307 without setting the color flag.

Describing the judgment processing of step S304 in detail, the compressed data size of the image data compressed at step S302 is detected (calculated), and the value indicating the compressed data size is compared with a value indicating a compressed data size of the corresponding sheet size chosen among compressed data sizes for the blank band data which are preliminarily calculated and stored for each sheet size. If the compressed data size of the band data is the same as the compressed data size of the blank band data, it can be known that no color data exist in one page and, therefore, it can be judged that the page is a black-and-white page.

The PDL interpreter 50 judges whether or not the generated image data correspond to the final band data (step S307), if the data correspond to the final band data as a result of the judgment (Yes at step S307), the processing goes to next step S115, and if the data do not correspond to the final band data as a result of the judgment (No at step S307), the processing goes back to step S301 to generate the next image data, and the processing is repeated until the image data to be judged corresponds to the final band data (S307→S301→ . . . →S307) The subsequent processing is the same as that of the first embodiment.

In this embodiment, the color/monochrome judgment can be performed accurately and rapidly in the same manner as that in the first embodiment and, since it can easily be judged that the band data are blank by comparing a compressed data size of the corresponding band data with a compressed data size for the blank and the processing of judging whether or not color data exist is omitted in that case (for a large amount of data), the color/monochrome judgment processing can further be accelerated.

Although it can be judged accurately and rapidly that the intermediate data are monochrome if it is judged based on an attribute of an object that the object data are monochrome rather than image data in the first color/monochrome judgment of each of the above embodiments, it may be judged that the intermediate data are monochrome if it is believed that a color image is not likely to be generated based on print data, for example, if the monochrome attribute is added to all the print data or if the image data are generated by an application that is not made on the premise that handles color images such as character recognition software.

Although the second color/monochrome judgment is performed based on the raster image data created for each piece of the band data in the first or third embodiment, the second color/monochrome judgment may be performed based on the raster image data corresponding to all the band data generated collectively. Although the band data are described as corresponding to a band image of an image to be printed, the band data is sufficient to be block data having a predetermined unit data (band) regardless of a shape of a band, and an arrangement form of pixel data included in the block data and the like is not particularly limited.

Although the PDL interpreter 50 judges whether or not an object exists in the intermediate data (step S201) and sets the attribute of the intermediate date as blank if no object exists (step S202) in the second embodiment, the judgment of whether or not an object exists and the setting of the attribute need not be performed for every well-known intermediate data, and they may be performed for a predetermined unit data block forming a portion of one page of image data by considering the unit data block broadly as an intermediate data. The raster image data corresponding to the intermediate data are not generated if no object exists, however, it is possibly designed so that the raster image data can be generated.

Although the image forming apparatuses of the above embodiments function as image processing apparatuses performing the image processing including the color/monochrome judgment processing, the function of the image processing apparatus may be separated from the image forming function and may be realized by the data processing apparatus 2 or a print server (not shown) connected to the LAN 5. It is also designed so that, for example, the data processing apparatus 2 or print server may include some or all of the functions of the constituent elements of the PDL interpreter 50, the image forming apparatus may include some or all of the functions of the print controlling unit 60, wherein the print controlling unit 60 (the print processing unit 64 included in it) receives bitmap data sent from the data processing apparatus 2 or print server through the LAN 5 and forms an image on a predetermined sheet. This kind of method that an image forming apparatus receives bitmap data is called as a host-based method and the configuration of the image forming apparatus can be simplified with that method.

According to the present invention, the following effects can be obtained.

According to the first aspect of the invention, a first judging unit judges whether or not an image is color or monochrome based on attribute data, and a second judging unit judges whether or not the image is color or monochrome based on color bitmap date generated by a bitmap data generating unit if the first judging unit judges that the image is color. Therefore, color/monochrome judgment can be performed accurately and rapidly.

According to the second aspect of the invention, since the image forming apparatus is controlled to output a monochrome image based only on monochrome bitmap data if the second judging unit judges that the image is monochrome, the image judged accurately as monochrome can be output, and a data size can be reduced when the bitmap data are stored.

According to the third aspect of the invention, since the color/monochrome judgment is performed based on the attribute data including at least a data type and color information of the image, it can certainly be judged that the image is monochrome, and the color/monochrome judgment can be performed rapidly before generating the bitmap data.

According to the fourth aspect of the invention, since the first judging unit judges that the image is color (even when the image actually is monochrome) if the data type is the bitmap data or if the color information is color and can judge that the image is certainly monochrome if the data type is data other than the bitmap data and if the color information is monochrome, a portion of judgment can be performed accurately and rapidly in the color/monochrome judgment, especially if the image is monochrome.

According to the fifth aspect of the invention, since the second judging unit sequentially performs the color/monochrome judgment for every band data and the judgment is omitted after it is judged that the image is color, the color/monochrome judgment can be performed rapidly.

According to the sixth aspect of the invention, since the second judging unit omits the color/monochrome judgment for the band data corresponding to the intermediate data with a blank attribute added, if the attribute of the intermediate data is blank, the processing of judging whether or not color data exist in the intermediate data is omitted (for a large amount of data). Therefore, the color/monochrome judgment processing can further be accelerated.

According to the seventh aspect of the invention, since the generation of the band data corresponding to the intermediate data with the blank attribute added is omitted, the processing can be accelerated.

According to the eighth aspect of the invention, since the second judging unit compares a compressed data size of band data compressed by a data compressing unit with a compressed data size of blank band data stored in advance and omits the color/monochrome judgment if these sizes are identical, it can easily be judged that the band data are blank and the processing of judging whether or not color data exist is omitted in that case (for a large amount of data), and therefore, the color/monochrome judgment can further be accelerated.

The invention claimed is:

1. An image processing apparatus that controls a predetermined image forming apparatus to output an image corresponding to bitmap data converted from predetermined print data, comprising:
   a first judging unit that judges whether the image is color or monochrome according to attribute data obtained based on the print data indicating the attribute of the image;
   a bitmap data generating unit that generates color bitmap data based on the print data if the first judging unit judges that the image is color, and generates monochrome bitmap data based on the print data if the first judging unit judges that the image is monochrome;
   a second judging unit that judges whether the image is color or monochrome based on the color bitmap data generated by the bitmap data generating unit; and
   a print controlling unit that controls the image forming apparatus to output a color or monochrome image depending on the result of the judgment of the first and second judging units, based on the bitmap data generated by the bitmap data generating unit.

2. The image processing apparatus as defined in claim 1, wherein if the second judging unit judges that the image is monochrome, the print controlling unit controls the image forming apparatus to output a monochrome image based only on monochrome bitmap data included in the color bitmap data generated by the bitmap data generating unit.

3. The image processing apparatus as defined in claim 1, wherein the first judging unit judges whether the image is color or monochrome based on the attribute data including at least a data type and color information of the image.

4. The image processing apparatus as defined in claim 3, wherein the first judging unit judges that the image is color if the data type is the bitmap data or if the color information is color, and judges that the image is monochrome if the data type is data other than the bitmap data and the color information is monochrome.

5. The image processing apparatus as defined in claim 1, wherein the second judging unit sequentially performs the judgment of whether the image is color or monochrome one-by-one for a plurality of the band data that should compose the color bitmap data generated by the bitmap data generating unit, and omits the judgment when once the image is judged to be color.

6. The image processing apparatus as defined in claim 1, further comprising:
   an intermediate data generating unit that generates a plurality of intermediate data for generating a plurality of the band data that should compose the bitmap data by the bitmap data generating unit, based on the print data; and
   a blank attribute adding unit that adds an attribute indicating blank to intermediate data not including data representing the image in the plurality of the intermediate data, wherein
   the second judging unit omits the judgment of whether the image is color or monochrome for the band data corresponding to the intermediate data with the attribute indicating blank added.

7. The image processing apparatus as defined in claim 6, wherein the bitmap data generating unit sequentially generates the bitmap data for each one of the band data and omits the generation of the band data corresponding to the intermediate data with the attribute indicating blank added.

8. The image processing apparatus as defined in claim 1, further comprising a data compressing unit that sequentially compresses a plurality of the band data that should compose a portion of the bitmap data generated by the bitmap data generating unit, wherein
   the second judging unit sequentially, one-by-one for the plurality of the band data, compares a compressed data size of the band data compressed by the data compressing unit with a preliminary stored compressed data size in the case of compressing the band data not including the data indicating the image by the data compressing unit and omits the judgment of whether the image is color or monochrome for the band data that have the compressed data size of the compressed band data identical to the preliminarily stored compressed data size.

9. The image processing apparatus as defined in claim 1, wherein the second judging unit judges whether band data in the image is color or monochrome, thereby judging whether the image is color or monochrome.

10. A controlling method of an image processing apparatus controlling a predetermined image forming apparatus to output an image corresponding to bitmap data converted from predetermined print data, comprising:
    a first judging step of judging whether the image is color or monochrome according to attribute data obtained based on the print data indicating the attribute of the image;
    a bitmap data generating step of generating color bitmap data based on the print data if it is judged in the first judging step that the image is color and generating monochrome bitmap data based on the print data if it is judged in the first judging step that the image is monochrome;
    a second judging step of judging whether the image is color or monochrome based on the color bitmap data generated in the bitmap data generating step; and
    a print controlling step in which the image forming apparatus is controlled to output a color or monochrome image depending on the result of the judgment of the first and second judging steps, based on the bitmap data generated in the bitmap data generating step.

11. The controlling method as defined in claim 10, wherein in the second judging step, judgment is made as to whether band data in the image is color or monochrome, thereby judging whether the image is color or monochrome.

12. A program embodied in a non-transitory computer readable medium for an image processing apparatus that controls a predetermined image forming apparatus to output an image corresponding to bitmap data converted from predetermined print data to perform the steps comprising:
    a first judging step of judging whether the image is color or monochrome according to attribute data obtained based on the print data indicating the attribute of the image;
    a bitmap data generating step of generating color bitmap data based on the print data if it is judged in the first judging step that the image is color and generating monochrome bitmap data based on the print data if it is judged in the first judging step that the image is monochrome;
    a second judging step of judging whether the image is color or monochrome based on the color bitmap data generated in the bitmap data generating step; and
    a print controlling step in which the image forming apparatus is controlled to output a color or monochrome image depending on the result of the judgment of the first and second judging steps, based on the bitmap data generated in the bitmap data generating step.

13. The program as defined in claim 12, wherein in the second judging step, judgment is made as to whether band data in the image is color or monochrome, thereby judging whether the image is color or monochrome.

* * * * *